United States Patent [19]
Resch, III

[11] Patent Number: 4,963,899
[45] Date of Patent: Oct. 16, 1990

[54] METHOD AND APPARATUS FOR IMAGE FRAME REGISTRATION

[75] Inventor: William A. Resch, III, Pittsford, N.Y.

[73] Assignee: Eastman Kodak Company, Rochester, N.Y.

[21] Appl. No.: 419,983

[22] Filed: Oct. 11, 1989

[51] Int. Cl.⁵ .......................................... G01D 15/10
[52] U.S. Cl. ..................................... 346/157; 358/80
[58] Field of Search ................. 346/157, 160, 153.1; 358/80; 101/137; 355/200, 210, 327

[56] References Cited

U.S. PATENT DOCUMENTS

| Re. 32,967 | 6/1989 | St. John et al. | 242/57.1 |
| 4,007,489 | 2/1977 | Helmberger | 358/78 |
| 4,025,186 | 5/1977 | Hunt, Jr. et al. | 355/14 |
| 4,477,176 | 10/1984 | Russel | 355/3 TR |
| 4,569,584 | 2/1986 | St. John | 346/157 |
| 4,684,243 | 8/1987 | Minor | 355/145 H |
| 4,705,386 | 11/1987 | Ogita et al. | 355/4 |
| 4,721,969 | 1/1988 | Asano | 346/157 |
| 4,728,984 | 3/1988 | Daniele | 355/6 |
| 4,740,802 | 4/1988 | Kauffman et al. | 346/157 |
| 4,821,066 | 4/1989 | Foote et al. | 346/157 X |
| 4,839,674 | 6/1989 | Hanagata et al. | 346/136 |

Primary Examiner—Donald A. Griffin
Attorney, Agent, or Firm—Mark Z. Dudley

[57] ABSTRACT

Image frame registration apparatus and methods are disclosed which have particular utility in a printing or reproduction apparatus that processes multiple image frames on a transported photosensitive member. Registration indicia for registering an image frame are written on the photosensitive member in an interframe or frame margin area. The indica are composed of discharged line patterns that are readable by a sensor array according to the charge variation or, after toning, the pattern of toned lines therein. The sensor array provides in-track and cross-track signal information to a control unit for synchronizing the electrostatographic processing of the registered image frames. In particular, servo-controlled drive means in the exposure and transfer stations are controlled with precision to provide, after the development and transfer of several registered component images to one or more receivers, an accurate multicolor reproduction.

14 Claims, 4 Drawing Sheets

METHOD AND APPARATUS FOR IMAGE FRAME REGISTRATION

BACKGROUND OF THE INVENTION

1. Field of the Invention

This invention relates, in general, to printing and reproduction apparatus and, more specifically, to the registration of multiple image frames in electrophotographic copiers, printers, and other apparatus having synchronized image exposure and related processing.

2. Description of the Prior Art

In high speed electrostatographic reproduction apparatus, it is a common practice to employ photosensitive media in the form of an elongated photoconductive web (or a photoconductive coating on a drum) adapted to record transferable images. Such media moves in a path in operative relation with various electrophotographic process stations. Ultimately a transferable image is created and transferred to a receiver to produce a print or reproduction.

In making monochrome reproductions with an apparatus utilizing a uniformly charged photosensitive media, areas of uniform charge are exposed to light to form a charge pattern, or latent image frame. In the color reproduction arts, the image frame can be designed to correspond to one component in a set of related color separation images; several successive image frames on the media may thus constitute a set of component (separation) images which ultimately are used to provide a composite multicolor image. The latent images are developed with pigmented marking particles to form transferable images. Each image is transferred sequentially to a respective receiver member that may in turn be used as one of the several color separations for a composite multicolor reproduction. Alternatively, each image may be transferred directly to a single receiver to create a multichromatic (multicolor) print in one step.

In a web-based reproduction or printing apparatus, the web is typically supported by several freely turning rollers and driven by one drive roller. (In alternative reproduction apparatus, a driven drum assembly is substituted for the web and rollers). Because these driving assemblies are electro-mechanical systems, there is a tendency for the web (or drum) to vary in speed as it is driven. Moreover, because the web or drum is photosensitive and typically is exposed one line at a time by a laser beam or linear LED array, the writing (exposure) of each image frame must be positioned accurately and consistently on the web. Each latent image frame, after development, may be transferred to a receiver sheet and then fused. It has been contemplated that in one particularly important application, the receiver sheet may be specially designed and fabricated such that after receiving the toned and fused image, the sheet may be directly employed as a separation master in a multicolor xeroprinting machine. In an example of another application, each of the latent images would be developed with a respective colored toner and then transferred seriatim to a single receiver.

As a further example, it will be noted that a drum-based system may be found to operate similarly, in that the web may be replaced by a photosensitive drum of sufficient circumference to engage the electrophotographic process stations in the same manner as does the web. The drum is typically driven by a motor and exposed, for example, by a scanning laser beam or other exposure device to provide a latent image at the drum surface on a line-by-line sequence. For clarity, however, the background of the present invention is discussed with reference to a web-based system.

The separation images must be accurately registerable in order to obtain faithful multicolor reproductions. In such composite image applications, the transferable images generated from these "master" separations are aligned for accurate superimposed registration during the creation of a multicolor composite print. The composite print will suffer from undersirable color shift and fringing if the registration of the component images is not accurately established and maintained. Even in the relatively less-complex task of providing accent color images, wherein as few as two component images are used, image registration can be critical to providing an acceptable composite print. Thus, the registration of each image frame must be accurately established at the creation of the latent image, and carefully monitored and maintained thereafter. Otherwise, the resulting composite prints will be of inadequate or unusable quality.

Multicolor reproduction apparatus that produce composite color images, or other apparatus that produce color separations useable for high volume reproduction work, thus present strict registration requirements. The production of a misregistered separation set is costly in that any subsequently-generated composite image is inaccurate and the printing process must be halted while a new set of separations are made. In the color reproduction industry, such a waste of process time is significant and is to be avoided.

Moreover, in printers and scanners that use image data that is transferred to and from a digital memory, the image frame registration of component images in the digitized data stream is often precisely controlled. Yet, when such data is used to write images in an apparatus that cannot maintain such registration, this precision is compromised.

A means of registration of images on a photoconductor with transfer to a copy sheet has been described in U.S. Pat. No. 4,477,176 to Russel, wherein a roller is used to retain and move a copy sheet so as to transfer several image frames from a photosensitive member. Timing of this roller is controlled by a logic and control unit which in turn receives timing signals regarding web movement from a timing signal generator that senses regularly spaced perforations on the web. As indicated in U.S. Pat. No. 4,025,186 to Hunt, Jr. et al, a photosensitive web may be provided with two types of perforations, one comprising a series of closely spaced perforations for providing timing signals and the other identifying frame locations on the web for use in triggering a flash exposure. However, the high degree of registration necessary to generate some composite images is difficult to achieve due to inaccuracies in perforation shape or positioning and in the performance of related perforation sensing and counter circuitry.

U.S. Pat. No. 4,007,489, issued to Helmberger, discloses a method and apparatus for creating color copies of an original by an electrostatic charging process. The apparatus includes at each recording station a line of electrodes. A mark on the paper is sensed at each station and the deviation of the position of the mark from a desired position in the line direction determines which electrode will be used to start the recording of the line. In the direction of transport, the deviation of the position of the mark is sensed and the start of the line recording is accordingly varied in time. However, the charges must be deposited onto the reproduction carrier itself, by separate electrode assemblies, with one assembly at each of three recording systems.

U.S. Pat. No. 4,740,802, issued to Stuckey-Kauffman et al, discloses a method for determining the position of media in a system where images are applied to the media at subsequent stations. The method includes the steps of placing on the media at a first position tracking information consisting of a pattern of electrostatic charge to provide information with regard to the alignment of the media at the first station, and at the second station, detecting the pattern of electrostatic charge to determine the alignment of the media at the second station. However, the media typically consists of electrostatic paper that ultimately is used as the reproduction carrier and the step of placing charge on the paper is achieved by charged styli that are positioned in close proximity to the surface of the paper. Furthermore, the tracking information is applied continuously and thus is not particularly related to an individual image. The tracking information is thus used to determine the position of the media, with the apparent presumption that the image position is thereby indirectly ascertainable. The tracking information thus does not appear to be directly informative of the image position.

SUMMARY OF THE INVENTION

It is an object of the invention to provide a method and apparatus for generating a composite image, or a component image set for generating a composite image, that is not subject to the image quality degradation caused by component image misregistration, as was described above.

It is therefore another object of the invention to provide a simplified method and apparatus for establishing and maintaining the registration of component images useable for the generation of a composite image in a scanning, printing, or other reproduction apparatus.

In accordance with the invention, method and apparatus are provided for image frame registration in an image reproduction apparatus employing a driven photosensitive member. A single recording means is provided for recording, on the photosensitive member, multiple component images and respective registering indicia for registering an area on the photosensitive member upon which each of the image frames is to be located. A sensing means is provided for detecting the indicia and generating corresponding sense signals, and a means responsive to the sense signals controls the recording of each of the multiple images in registration with subsequent images on the photosensitive member.

In an alternative embodiment of the invention, an apparatus for reproducing an image comprises a photosensitive member, a recording means for recording multiple component images and respective registering indicia on the photosensitive member, and a means for detecting the indicia and generating corresponding sense signals. There is further provided a means for developing the multiple component images, a means for transferring at least two developed images to a receiver, and a means responsive to the signals for controlling the recording and transfer of the component images in registration.

BRIEF DESCRIPTION OF THE DRAWINGS

In the detailed description of the preferred embodiment of the invention, reference is made to the accompanying drawings, in which.

In the drawings and specification to follow it is to be understood that like numeric designations refer to components of like function.

DESCRIPTION OF THE PREFERRED EMBODIMENT

The apparatus of the preferred embodiment will be described in accordance with an electrostatographic recording media. The invention, however, is not limited to methods and apparatus for creating images on such media, as other photosensitive media such as photographic film, etc. may also be used to advantage within the spirit of the invention. Because electrostatographic reproduction apparatus are well known, the present description will be directed in particular to elements forming part of, or cooperating more directly with, the present invention. Apparatus not specifically shown or described herein are selectable from those known in the prior art.

Figure 1:
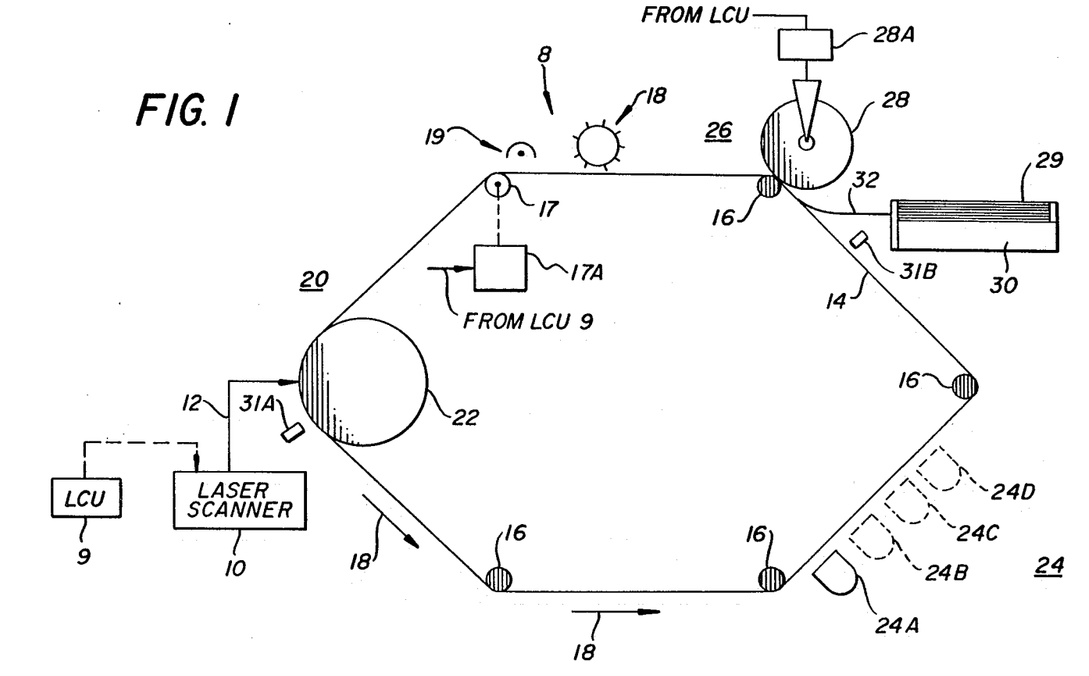
FIG. 1 is a schematic view illustrating the operation of a web-based laser printer constructed according to the present invention.

Referring now to FIG. 1, a laser printer apparatus 8 of the electrophotographic type is shown, which employs a driven photosensitive member adapted to carry transferable images as was discussed in reference to the background of the present invention. The photosensitive member, in this example a photoconductive web 14, is constructed in an endless loop. The web 14 is carried by support rollers 16 and a steering roller 17 while being driven in the direction indicated by arrow 18. The web 14 is, for example, of the type described in U.S. Pat. No. 3,615,414, the disclosure of which is hereby incorporated by reference. The steering roller 17 effects cross-track alignment according to an adjustment to its main axis as provided by steering roller servo system 17A.

The reproduction apparatus 8 includes a logic and control unit 9 for monitoring and controlling the various process stations and drive means in the apparatus 8, as will be discussed below. An exposing or imaging station 20 is provided which in the preferred embodiment is a laser scanner 10 for emitting a laser beam 12, although alternatively an LED linear array or other non-laser light source is also useable. The exposing or imaging station 20 includes a driving means, such as a drive roller 22. During the operation of the printer, the web 14 travels across roller 22 and is cleaned by a brush 18 and charged at a charging station 19. Charging station 19 provides a primary electrostatic charge level to each image frame that is to be used in forming a reproduction. The level of primary charge deposition may be adjusted in accordance with the type and formulation of the particular toner to be applied to that frame.

Under the control of the LCU 9, the web is then exposed, line by line, by the laser beam 12 to construct a desired electrostatic latent image on the web 14. The latent image in the image frame moves, with the movement of the web 14, through other stations of the printer. At the development station 24, toner is applied to the web 14, and at the transfer station 26, the developed image on the web 14 is transferred, with the aid of the transfer roller 28, to a receiver 29 supplied from a feeder 30. The receiver 29 travels along the guide 32 and between the rollers 16 and 28 for transfer of the image from the web 14.

The movement of the web 14, as caused by the rotation of the drive roller 22, is provided by a precision servo-controlled motor. (For clarity, the drive roller 22 and other moving mechanisms in the apparatus 8 are assumed to include all other required motor apparatus not specifically illustrated in FIG. 1.) The engagement of the receiver 29 with nip at the transfer roller 28 and web support roller 16 is provided by a drive means powered by a similar servo-controlled motor in the feeder 30. Each motor is further equipped with known speed and position encoders which supply servo sense (monitoring) signals to the LCU 9. Additionally, the LCU 9 provides servo drive signals to the motors so as to effect a precise control over the web rotation and the positioning of the receiver. Further, as the remainder of the process stations, e.g., development station 24, cleaning station 18, and charging station 19 are also actuated under control signals provided by the LCU 9, each step in the electrophotographic process is effected with precision. The various servo loops thus provided allows the LCU 9 to compensate for mechanical imprecision, such as friction in the various motors and drag imposed in the web 14 by, for example, the cleaning station 18. By providing independent servo system control of the motors, the apparatus 8 may be operated without the interlocking mechanical means (i.e., gear trains, belts, cams, levers, and the like) common to the typical reproduction apparatus. Further details on the illustrated printer may be found in the commonly-assigned, co-pending U.S. application Ser. No. 248,075, filed on Sept. 23, 1988 in the name of F. S. Jamzadeh, the disclosure of which is hereby incorporated by reference.

Located above the web 14 are sensor arrays 31A and 31B at positions which are fixed at, respectively, the exposure station 20 and the transfer station 26. The sensor arrays provide image frame registration signals as will be discussed below in greater detail.

Figure 2:
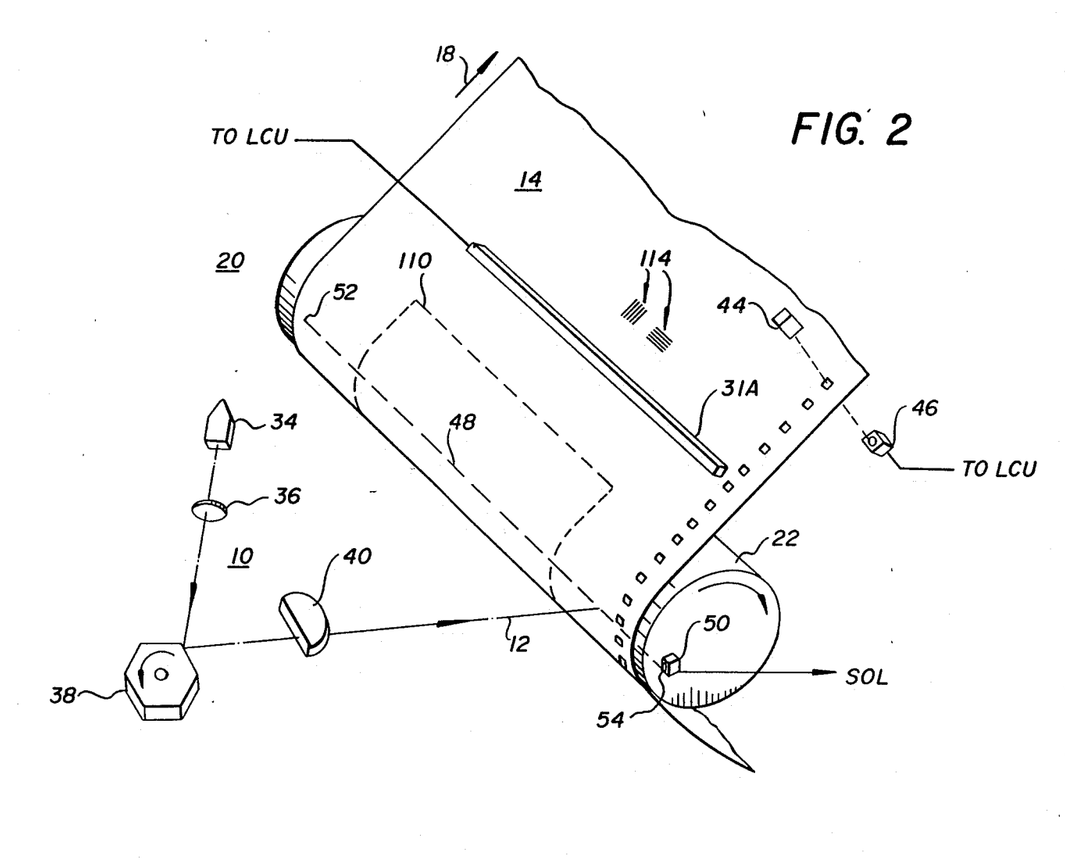
FIG. 2 is a schematic perspective view of the scanning and exposing portion of the printer shown in FIG. 1.

With reference to FIG. 2, an exposure station 20 is operated to expose the web 14 to provide an electrostatic latent image of the image to be reproduced. The charged web 14 is moved in the direction of arrow 18 about its closed loop path. Each image frame 110 (the area of the web 14 in which an image is to be written) is then exposed at station 20 to light from a laser source 10 that is directed to the web 14. The exposure alters the uniform charge and forms a latent image (a charge pattern) at each exposed image frame. The charge pattern corresponds to the modulating image information furnished to the laser source 10 by a suitable data source, such as a computer, optical scanner, or other appropriate signal source. It should be understood that the various image frames are separated either spatially, i.e., apart from each other by an interframe distance on the length of the web; or temporally, whereby the same image frame is used to form different color separation images in succeeding time periods.

In making multicolor reproductions by, for example, the subtraction color process, the data used to modulate the light from the laser 10 is divided into primary color separation images each of which modulate the exposure of a successive image frame. Thus each latent image frame represents one respective color separation image of a set that comprises a composite multicolor reproduction. In the case of the illustrated scanner 20, the light beam 12 moves in the laser scanner's main scanning direction while being modulated by image information that is provided on a dot by dot basis for each scan (or exposure) line. The web 14 is continuously advanced in the web path direction 18. As previously described, alternative light sources, such as an LED printhead or other point-like radiation sources, may be used in place of the exposure station 20. Still other line-by-line exposure sources, such as imaging sources which include direct optical recording from originals, may also be used.

The modulated electrostatic charge patterns thereby formed are developed with pigmented marking particles by a development station 24 to transform each latent image to a transferable image. The development station 24 includes a developer which may consist of iron carrier particles and pigmented electroscopic toner particles with an electrostatic charge opposite to that of the latent electrostatic image. The developer is brushed over the photoconductive surface of the web 14 and the toner particles adhere to the latent electrostatic image to form a visible, transferable image. The development station may be of the magnetic brush type with one or two rollers. Alternatively, the toner particles may have a charge of the same polarity as that of the latent electrostatic image and the image is developed in accordance with known reversal development techniques.

The images are then transferred seriatim from the image frames of the web 14 to a corresponding number of receivers 29 that are advanced in timed relationship for engagement with the web 14 at the transfer station 26. After transfer, each receiver is removed from the transfer roller and transported to a fuser (not shown) where the toned image is fixed to the receiver.

A monochrome reproduction, or a set of individual color separation images on separate receivers 29, may be produced as described hereinabove with a single development station 24A. The single monochrome reproduction (using a toner of, for example, black pigment) may be an accurate component image for use as one of the color separations, or masters, of a color composite image and as such may be utilized in a high-speed xeroprinting, lithographic, or other printing system. The receiver can be of a variety of specialized or conventional compositions, including but not limited to paper, aluminum plate, transparent film stock, treated film stock such as nickelized ester, or photoconductive film.

The image frame registration method and apparatus as taught herein is directed not only to the illustrated apparatus 8, but to any reproduction apparatus in which the surface of a moving photosensitive media is exposed to generate a plurality of image frames for the formation of transferable images. The development station 24 may be modified to include, for example, additional magnetic brush development apparatus (e.g., additional development stations 24B, 24C, and 24D shown in phantom) so as to generate a multicolor reproduction of the original image on a single receiver sheet. A respective plurality of modulated electrostatic charge patterns (latent images) as described hereinabove are thereby developed with colored toner particles, each color provided from one in a respective plurality of development stations, to form a set of transferable images. The several images are then transferred seriatim from their respective image frames of the web 14 to a single receiver 29. The receiver is recirculated on or about the transfer roller 28 in synchronization with the approach of each image frame of the web 14 and is urged onto the web 14 in alignment with a toned image. The set of transferred images forms an accurately superimposed, multicolor composite image on the receiver. Further details regarding a multicolor reproducing apparatus are provided in U.S. Pat. Nos. 4,477,176 and 4,777,510, the disclosure of which is incorporated herein by reference.

Figure 3:
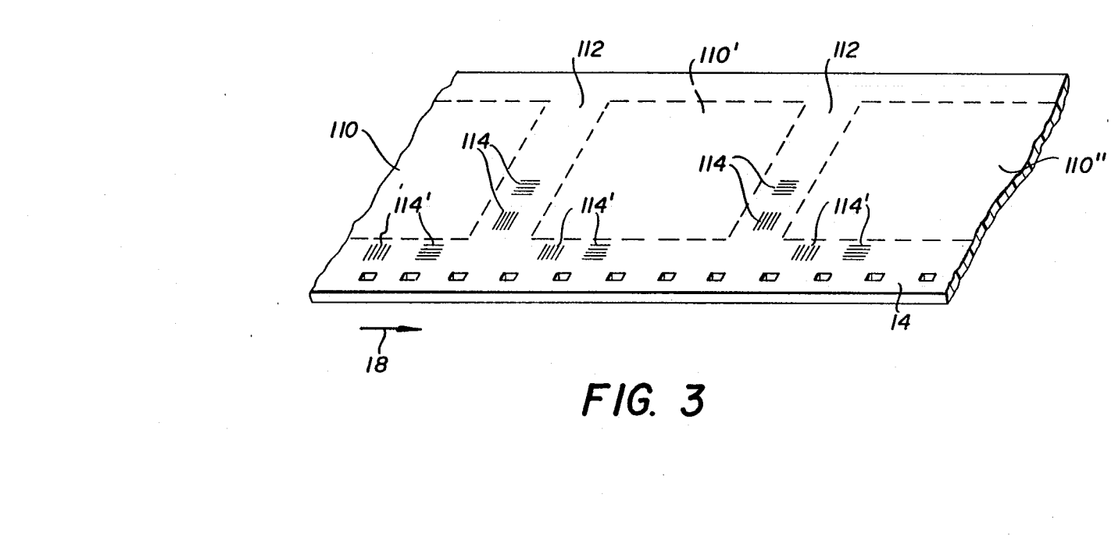
FIG. 3 is a side perspective view of an embodiment of the present invention wherein registration indicia are written on the web of FIGS. 1 and 2.

As shown in FIG. 2 and with reference now to FIG. 3, the writing of an image frame (hereafter, a frame write sequence) begins when one or more corona charging units, exemplified by charger 19, located upstream of the exposure station 20, applies a uniform primary electrostatic charge, of say negative polarity, to the web 14 as it passes the charger and approaches the exposure station 20. The laser system in exposure station 20 includes a laser 34, lens 36, rotating polygonal mirror 38, and a f-Θ lens 40. Actual operating exposure stations may contain more and different types of lenses for a particular application, but the arrangement shown in FIG. 2 is illustrative of the invention and is simplified in the interest of clarity. The beam of light produced by the laser 34 is modulated by associated electrical circuitry not shown in FIG. 2. Although the modulation may be digital, that is, the beam may be switched on or off, other forms of modulation may be used. It is also within the contemplation of the invention that the laser beam could be modulated in an analog fashion for the purpose of creating different levels of beam intensity by using a suitable modulator, such as an acousto-optical modulator.

The web in-track position is coarsely monitored by the LCU 9 which counts the passage of web perforations through a light beam directed from a photoemitter 44 to a photosensor 46. As the charged area passes into the exposure station 20, the web 14 is exposed to provide indicia 114 on the interframe area 112. The photoconductive properties of the web 14 will then cause the primary charge in the exposed areas of the web to be discharged. (In an alternative embodiment also illustrated in FIG. 3, the indicia 114' may be written in the edge margin of the preceding image frame 110'.) The indicia 114 are preferably a pair of precision line patterns that are written by the laser beam 12 onto the charged web 14. A cross-track line pattern is composed of a group of short parallel lines of precise spacing, such as in a vernier scale, that are written parallel to the web in-track direction to provide a cross-track image frame registration indicator. A second line pattern is composed of a similar group of parallel lines that together are perpendicular to the in-track direction and thus form an in-track registration indicator. Each indicator is preferably generated by activating and modulating the laser beam 12 according to a stored instruction set and predetermined pattern data which resides in the LCU 9.

The indicia 114 are written in the interframe area 112 that precedes the image frame to be written. (If the indicia 114' are alternatively written in the web edge margin of the preceding image frame 110', the laser 34 is modulated during the preceding frame write sequence to provide both the preceding image frame 110' and the indicia 114' during its respective scans. A third image frame, 110'', is also illustrated for clarity.) As the web 14 continues to rotate, the newly-written indicia 114 will accordingly pass under the sensor array 31A as the image frame 110 to be written approaches the exposure station 20. The patterns of electrostatic charge in the indicia 114 are detected by the sensor array 31A which is precisely fixed on a cross-track axis above the web 14. (Similarly, sensor array 31B is precisely fixed on a cross-track axis above the web 14 at a position upstream of the transfer station for sensing the indicia 114 at a later time.) Sensors 31A and 31B each comprise a plurality of discrete sensors which span the majority of its length; each sensor is responsive to the presence or absence of electrostatic charge in the indicia 114. The individual output of each sensor is polled by the LCU 9 at a high rate and the active outputs are sensed. During the passage of the indicia 114 beneath the sensor arrays 31A and 31B, the charge variations exhibited by the moving line patterns are sensed and in-track and cross-track position signals are inputted to the LCU 9.

Alternatively, in an intermediate step, the web may be rotated one revolution to allow the newly-written indicia 114 to be toned at the development station 24 before resuming the image frame write sequence. The line patterns are thereafter optically readable by illuminating the indicia 114 with an optional light emitter, and sensing the pattern of reflected light. Sensors 31A and 31B in this alternative would each be configured for emitting and sensing light. In a preferred embodiment, each subsection of the sensor array comprises a known photoemitter/photosensor pair. A plurality of the pairs are arranged in a linear fashion along the length of the sensor array in a single bar-type device. The reflected light pattern is thus more precisely detected by a device having each element of the emitter/sensor pair in close proximity. Alternatively (in the case of a translucent web 14) the photoemitter/photosensor pair can be separated by the web 14. The toned indicia would then pass between the pair and provide a pattern of transmitted light. Of course, other light source and light sensor configurations known in the art are also useable.

Hence, as the frame write sequence continues, the exact positions of the lines in the cross-track indicia 114 are determined by noting which of the sensors detect a line or a portion thereof and which do not. The in-track position signal has a variation over time that corresponds to the individual lines of charge (or, alternatively, the individual lines of toner) that pass sequentially below a sensor 31A or 31B.

In addition, servo sense signals from the motor drive of the drive roller 22 are received by the LCU 9 to provide information on the rotation of the roller 22, and hence of the web 14. By employing appropriate signal conversion and pulse code demodulation techniques in the LCU 9, the signals generated by the sensor array 31A and the drive roller encoder are used to determine the location of the image frame 110 and to measure its passage along the web direction 18 as the web 14 rotates around the rollers 16. The absolute position of the respective latent image in the image frame 110, as well as its position relative to the latent images in the 110' and 110 is then calculated and stored in the LCU 9.

Figure 4:
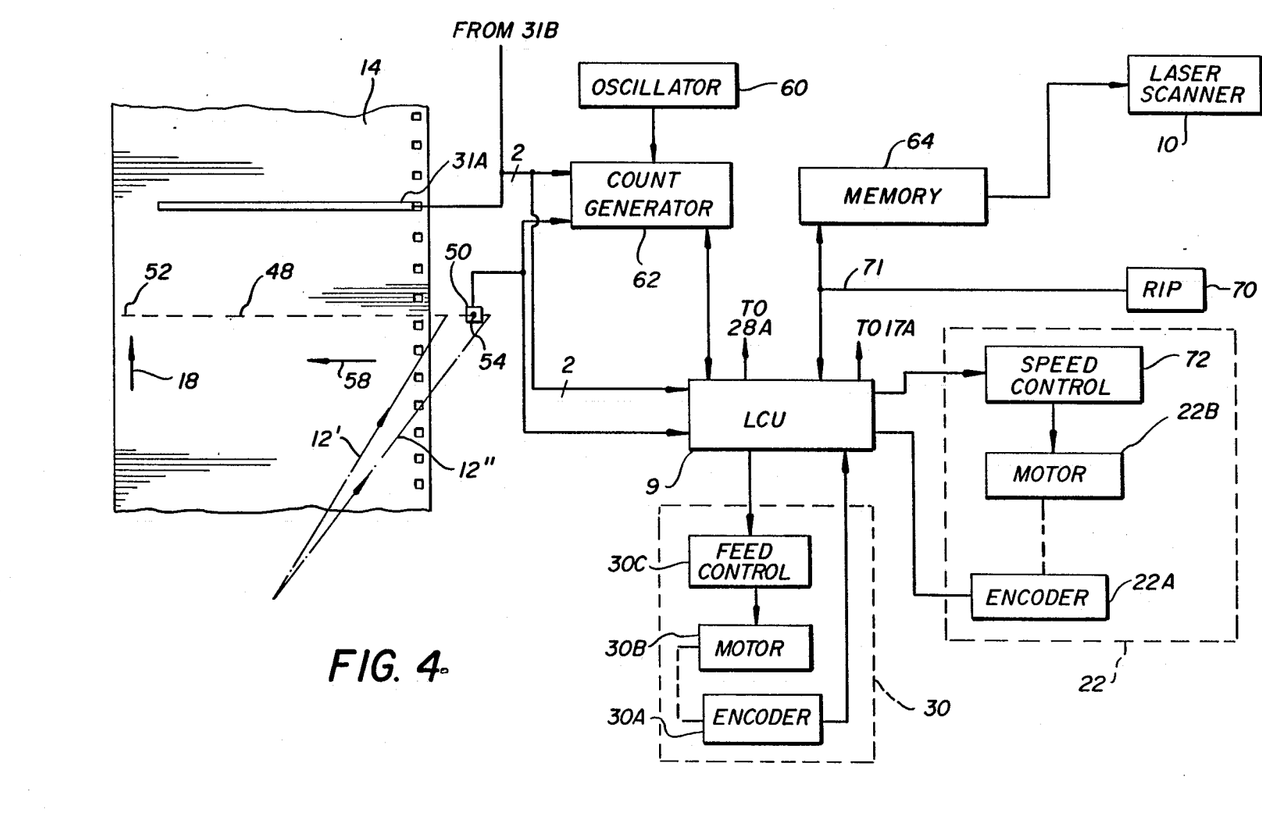
FIG. 4 is a block diagram illustrating a circuit arrangement for implementing image frame registration as taught by the invention.

FIG. 4 shows in greater detail the signal flow in the preferred embodiment of the image frame registration apparatus according to the present invention. Note that the photoconductive surface does not have to be in the form of a web to benefit from the teachings of the present invention. A rotating drum or roller of photoconductive material, driven by a servo-controlled drive motor, can also be corrected using the embodiments to be described. For clarity, however, the web-based system will be described.

Thus, when the image frame 110 does arrive at the correct position for receiving exposure, the signals from the sensor array 31A have already been decoded to allow the LCU to monitor the approach of the image frame 110 to the exposure-ready position. Each image frame is thus consistently located and receives a latent image in an exposure that is accurately registered with each of the latent images in the preceding image frames provided on the web 14.

At such a moment, the LCU generates a SOP (start of page) signal to indicate that the photoconductive web 14 is physically in position to receive scanned information from the laser scanner 10 to construct the latent image on the web 14. After the SOP signal is produced, image data is fed to the laser 34 for the purpose of modulating the laser beam 12 as it scans the scan line 48. Modulation of the laser beam starts when the exact location of the laser beam is determined as the detection of the laser beam by the light detector 50 signifies that the laser beam has returned substantially to the edge of the web 14 and is starting another transition across the web along scan line 48. Upon the production of a detection or start of line (SOL) signal, the beam modulation begins. Note that although the laser beam 12 may be oriented anywhere along the scan line 48 at a particular moment because of the rotation of the mirror 38, the laser beam 12 would be in the off-state pending the start of exposure of the web. In the worst case, the laser beam 12 may be just past the light detector 50 when the SOP signal is issued, thereby requiring that the laser beam travel to the end 52 of the scan line until the mirror moves the beam 12 to the beginning position 54 of the scan line 48.

The web 14 is driven in direction 18 and the laser beam moves in direction 58 along the main scan line 48. The laser beam is detected by the light detector 50 after the SOP signal has been issued. Assuming that the laser beam 12' is at the indicated position when the SOP signal is issued, the SOL signal will not issue until the beam 12 scans the line 48 completely and returns to scan the line again beginning at the position of laser beam 12" where it trips the detector 50 and issues the SOL signal. The difference between the two signals is calculated by the LCU 9 which senses a signal produced by a count generator 62. The oscillator circuit 60 provides clocking pulses to the count generator 62, although other electrical circuits may be used to generate the same output characteristics. The count generator 62 counts the number of oscillator pulses from oscillator 60 after the SOP signal has been received and before the SOL signal is received. Logic gates within the generator 62 activate, deactivate and reset the counters therein during the time interval between the receipt of the two start signals, namely the SOP and the SOL signals.

Additionally, the output of the count generator 62 applied to the LCU 9 allows the LCU to control the release of rasterized image information from an image memory 64. The image data thus flows from the image memory 64 to the scanner 10 under the control of the LCU 9. The image data supplied on line 71 after being supplied is rasterized by a rasterizing image processor (RIP) 70 and originates from a variety of image data sources (not shown), such as a computer, word processing system, or image scanner.

Logic and microcomputing circuitry in the LCU 9 polls the sensors in the sensor arrays 31A and 31B. The LCU 9 also receives signals from detector 50 and information from the count generator 62 and a web position encoder 22A on the drive roller 22. The information received may inform the LCU 9 of the need for slight adjustment of image frame location, which may be accomplished in one, or both, of two techniques. The first technique is effected before the latent image exposure, and will now be described. The second is effected just prior to transfer of the developed image to a receiver, and will be described shortly with respect to the operation of the transfer station 26 and the receiver feeder 30.

The image frame location may first be corrected by altering the position of the web 14. A signal provided from the LCU 9 to a web speed control 72 is used to effect a precision speed change in a drive motor 22B to ensure the precise in-track positioning of the image frame 110 at the onset of latent image exposure. The LCU 9 may also effect a cross-track image frame registration correction by signaling a steering roller servo system 17A to vary the axis of rotation of the steering roller 17. The web cross-track position, and hence the image frame position, is thus adjusted. Further details on the adjustment of the web cross-track location is provided in U.S. Pat. No. 4,572,417, issued to Joseph et al., the content of which is incorporated herein by reference.

The image write sequence thus forms a latent imagewise charge pattern in the respective image frame which corresponds to the image to be reproduced. As illustrated in FIG. 3, several latent images may be written in successive image frames 110, 110', and 110", and each image frame is accurately and sequentially registered as described above. Thereafter, travel of the web then brings the image frames into the development station 24. The development area, as has been noted, may include a plurality of magnetic brush development stations, each containing a different color of toner. For example, the toner colors may be cyan, magenta and yellow. Thus, in addition to black toner particles in station 24A, the cyan toner particles may be in station 24B, magenta toner particles in station 24C, and yellow particles in station 24D. The toner particles are agitated in the respective developer stations to exhibit a triboelectric charge of opposite polarity to the latent imagewise charge pattern. The web 14 is made to engage the respective magnetic brushes by known actuator means (not shown) and the charged toner particles of the engaged magnetic brushes are attracted to the oppositely charged latent images. The logic and control unit 31 selectively activates the actuator means in relation to the passage of a latent image that is to be processed with the respective color toner.

The developed latent images must be transferred to a one or more receiver sheets in accurate register. Each image frame will contain a component image which ultimately is superimposed on other such component images to create a composite image. If the apparatus 8 is operated to produce component image masters, useable for example in xeroprinting, it is preferable that each component image be transferred to a position on the respective receiver sheet that is identical with the positions taken by the other images on the other receiver sheets. The master sheets thus created are easily mounted in a xeroprinting or similar printing press with little or no adjustment to the mounted sheets. Alternatively, the apparatus may be operated to tone each component image with colored toner particles as described above, and then transfer the component images to a single receiver sheet, in superimposed relation, to form a color reproduction of the original document sheet. Apparatus for providing such registered transfer is fully described in U.S. Pat. No. 4,477,176, issued Oct. 16, 1984 in the name of Matthew J. Russel, the contents of which are incorporated herein by this reference.

Briefly, this is accomplished by feeding a receiver sheet 29, from a supply stack stored in feeder 30, in synchronism with movement of the first image frame so that the receiver sheet engages the web in registration with the first image frame. The transfer roller 28 includes a compliant insulating surface thereon and is biased to a potential suitable for transfer of the developed image on the first image frame to the receiver 29. The feeder 30 includes an encoder 30A to provide sheet positioning information to the LCU 9. Accordingly, the LCU 9 provides input to a servo controller 30C which operates a servo motor 30B for advancing and guiding the sheet.

According to a feature of the present invention, as the web 14 rotates to bring a first developed image to the transfer station 26, the respective indicia 114 which precede the image frame 110 are sensed by a sensor array 31B. In-track and cross-track signals thus are provided to the LCU 9 in a process identical to that described with reference to sensor array 31A. The LCU 9 thus provides continued movement of web 14 in a synchronized feed of the receiver 29 by the feeder 30 to bring the lead edge of the receiver into a registered transferable relationship with the developed image. As was mentioned above, the image frame registration correction is thus operable at the transfer station (that is, after the latent image has been written and developed). By controlling the feed of the receiver into the nip between the transfer roller 28 and roller 16, the receiver 29 assumes a position that includes any slight adjustments required by the LCU 9 for registration correction. The image frame registration is thereby completed because the receiver is shifted when necessary. An in-track shift is accomplished by delivering the receiver 29 to the nip at a measured amount of time earlier or later than nominal. For a cross-track correction, the receiver 29 may be shifted (at the feeder 30 before entering the nip) in a measured lateral amount by a receiver edge guide means driven by the feeder motor 30B.

If the developed image in the successive image frame 110′ is to be transferred to different receiver sheet, the first receiver sheet 29 is then removed from the transfer roller 28 and fused by means not shown. A new receiver sheet is then provided and registered to the oncoming successive image frame 110′ by virtue of the sensing of the indicia 114 which precede that image frame. The registration is effected by the control of the LCU 9 as described above. The developed images from further successive image frames are transferred similarly (and each is accurately registered to its respective receiver sheet) until all transfers are complete.

However, if the first transferred image on the respective receiver sheet 29 is to receive (via superposition) a successive developed image, such as that in image frame 110′, the receiver sheet 29 remains on the roller 28 for a registered transfer of the second developed color image to the sheet. The roller 28 includes therein encoder means (not shown) which provides respective roller speed and position information to the LCU 9. Once again, the sensor array 31B provides registration signals to the LCU 9 by detecting the indicia 114 which respectively precede the image frame having the developed image to be transferred (in this instance, image frame 110′.) As the receiver is already retained on the transfer roller 28, registration correction is effected (if necessary) by altering the rotation rate and axial position of the roller 28. A transfer roller servo system 28A receives cross-track and in-track correction signals from the LCU 9. Respective adjustments are then made by shifting the roller 28 laterally on its central axis, or by adjusting its speed relative to the speed of the web 14. The servo system 28A may also provide a slight, momentary retraction of the roller 28 so as to release the roller-to-web contact pressure while the roller adjustments are made. The developed images from further successive image frames are thereby transferred in register to the receiver sheet until all component image transfers are complete.

The receiver sheet is then separated from the web 14 or roller 28 and conveyed to a fuser, then to an exit hopper or accessory finishing unit (not shown). While the several developed images are being transferred and then fused, the web 14 continues to travel about its path and proceeds through a cleaning area including a cleaning brush 18. The web is cleaned of toner to thus prepare for a new image write sequence. Because each frame write sequence operates on a freshly charged web 14, all indicia 114 from the previous write sequence are erased.

The disclosed method and apparatus for image frame registration thus provides several advantages. Because the indicia 114 are generated by the laser directly on the photosensitive web, in close proximity to the image frame, each latent image in the respective image frame may be written in register with the preceding images. Additionally, because the indicia 114 are formed from high-resolution, precisely-located line patterns, the latent images are registered more accurately than that provided by the perforation-sensed location signals used in the prior art. The indicia 114 provide information which, in conjunction with the coarser information provided by the web perforation sensor 46, are suitable for vernier-scale sensing of the image frame 110. Further, the indicia 114 are oriented to provide both in-track and cross-track position signals to the LCU 9. The increased acuracy in locating the image frame allows the LCU 9 to precisely control the exposure and transfer of each component image for enhanced image registration of multiple component images.

Scanning errors in the positioning of the laser beam are compensated because both the indicia 114 and the latent image are written by the same exposure station, and thus each of the indicia may be relied upon as being located in an unvarying relationship with its respective image frame. The indicia 114 are rewritten with each new latent image and thus are not subject to mechanical tolerances, mechanical deformation, or aging, as do web perforations or other mechanical devices in conventional registration arrangements. Overall accuracy and reliability is improved, and the need for geared driving means and other interlocking mechanisms is eliminated.

The apparatus and method disclosed herein permits the construction of an improved reproducing or printing apparatus. Such an apparatus may be employed to provide multiple registered masters for producing composite multicolor prints of an original image, or to provide a composite accent or multicolor reproduction directly. The reproductions will exhibit greater color fidelity and image sharpness. This fidelity and registration accuracy may be achieved by use of the disclosed image frame registration method or apparatus in any line-scanning printing or copying apparatus.

It is emphasized that numerous changes may be made in the above-described apparatus and method without departing from the teachings of the invention. For example, those skilled in the art will recognize that the invention is equally applicable to a reproduction apparatus wherein the photosensitive member is in the form of cut sheet photoconductive members transported on the surface of a belt, or in the form of a photoconductive layer on a rotating drum. It is intended that all of the matter contained in the foregoing description, or shown in the accompanying drawings, shall be interpreted as illustrative rather than limiting.

What is claimed is:

1. An apparatus for reproducing an image, comprising:
   a photosensitive member;
   a single recording station for recording multiple latent images, in respective image frames, and respective image frame registration indicia on the photosensitive member;
   sensing means for detecting the indicia and generating corresponding signals; and
   means responsive to the signals for controlling the recording of selected ones of the multiple latent images in predetermined spaced relationship with at least one prior recorded latent image on the photosensitive member.

2. The reproduction apparatus claimed in claim 1 further comprising development means for developing the indicia.

3. An apparatus for reproducing an image, comprising:
   a photosensitive member;
   recording means for recording multiple latent images, in respective image frames, and respective image registration indicia on the photosensitive member;
   means for sensing the indicia and in response thereto generating respective signals;
   means for developing at least first and second ones of said latent images to provide respective developed images;
   means for transferring at least said first and second developed images to a receiver; and
   control means responsive to the signals for controlling the transfer of the second developed image in registration with the first developed image.

4. The reproduction apparatus claimed in claims 1 or 3 wherein the indicia further comprise an in-track indicator.

5. The reproduction apparatus claimed in claims 1 or 3 wherein the indicia further comprise a cross-track indicator.

6. The reproduction apparatus claimed in claim 5 wherein the indicia further comprise an in-track indicator.

7. The reproduction apparatus claimed in claim 3 wherein the development means further develops the indicia.

8. The reproduction apparatus claimed in claims 1 or 3 further comprising means for providing color separation data signals to the recording station or means, whereby the recorded multiple images are respective color separation images.

9. The reproduction apparatus claimed in claim 3, wherein the control means provides servo signals for controlling the position of the photosensitive member in accordance with the sensed indicia signals; and further comprising means for adjusting the position of the photosensitive member in response to the servo signals.

10. The reproduction apparatus claimed in claim 3, wherein the control means provides, in accordance with the sensed indicia signals, first servo signals for controlling the position of the photosensitive member and second servo signals for controlling the position of the receiver; and further comprising:
    means for adjusting the position of the photosensitive member in response to the first servo signals; and
    means for adjusting the position of the receiver in response to the second servo signals.

11. A method for reproducing an image, comprising the steps of:
    providing a photosensitive member;
    recording on the photosensitive member, from a single recording station, multiple latent images, in respective image frames, and respective image frame registration indicia for registering each of the latent images;
    detecting the indicia and generating corresponding signals; and
    in response to the signals, controlling the recording of selected ones of the latent images on the photosensitive member.

12. A method for reproducing an image, comprising the steps of:
    providing a photosensitive member;
    recording multiple latent images, in respective image frames, and respective image frame registration indicia on the photosensitive member;
    detecting the indicia and generating corresponding signals;
    developing at least first and second ones of said latent images to provide respective developed images;
    transferring at least said first and second developed images to a receiver; and
    in response to the signals, controlling the transfer of said second developed image in registration with said first developed image.

13. A reproduction method as claimed in claims 11 or 12 wherein the recording step comprises exposure of the photosensitive member to a scanning laser beam.

14. A reproduction method as claimed in claims 11 or 12 wherein the exposures of the latent images are modulated by image data signals which correspond to respective color separation images.

* * * * *